Figure 1:
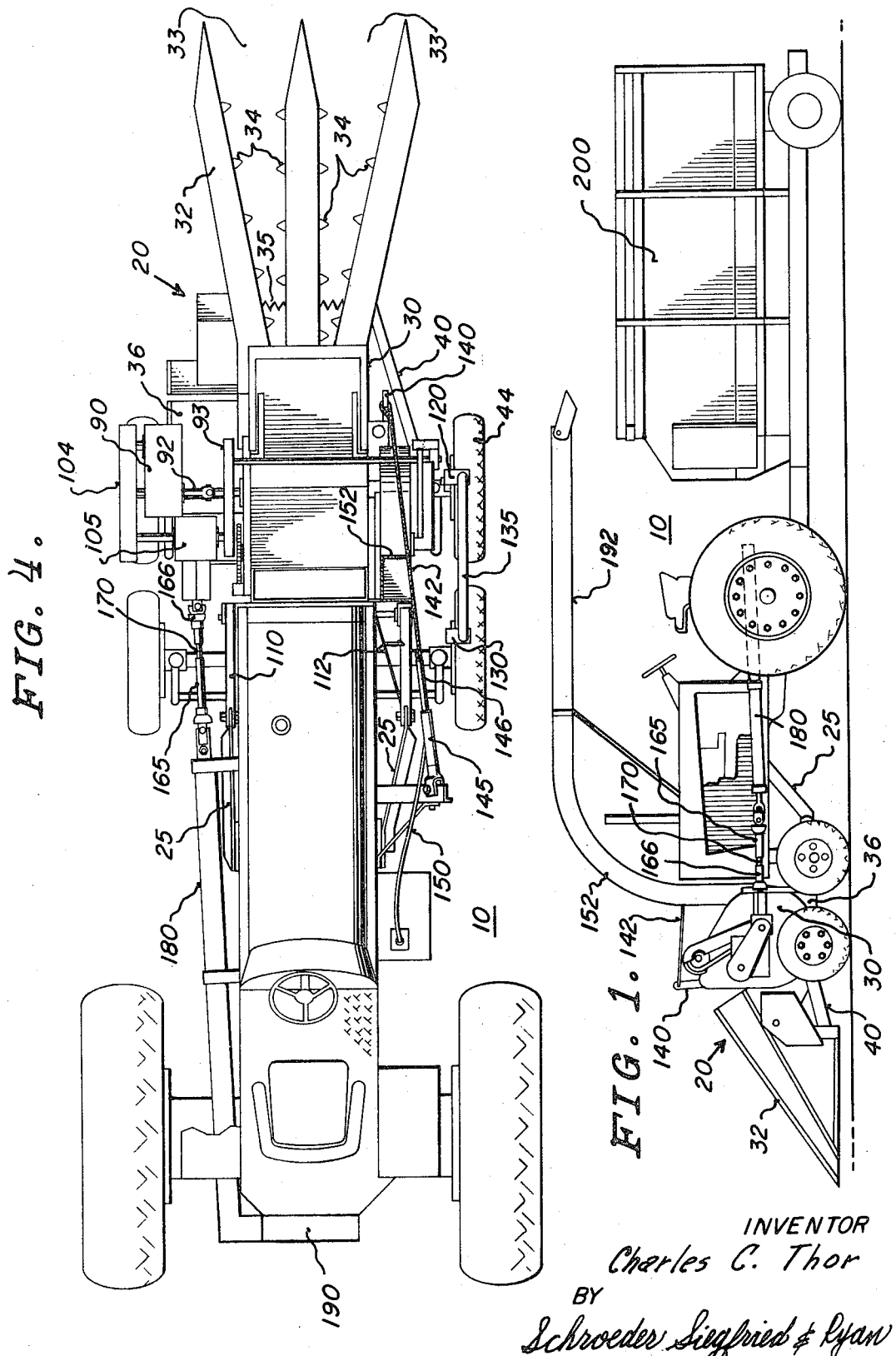

United States Patent
Thor

[15] 3,664,098
[45] May 23, 1972

[54] REMOVABLE SILAGE CHOPPER

[72] Inventor: Charles C. Thor, Box 554, Hutchinson, Minn. 55350

[22] Filed: Apr. 26, 1971

[21] Appl. No.: 137,513

[52] U.S. Cl. ................................................56/13.9, 56/502
[51] Int. Cl. .........................................................A01d 45/02
[58] Field of Search ........................56/13.1, 12.8, 13.6, 13.8, 56/13.9, 61, 500, 501, 502, 13.3

[56] References Cited

UNITED STATES PATENTS

| | | | |
|---|---|---|---|
| 2,702,631 | 2/1955 | Hamaker | 56/12.8 X |
| 2,972,848 | 2/1961 | McKee | 56/13.3 |
| 3,325,982 | 6/1967 | Fogels et al. | 56/11.2 |
| 3,530,650 | 9/1970 | Phillips | 56/2 |
| 3,599,404 | 8/1971 | Fernandez | 56/12.8 |

*Primary Examiner*—Russell R. Kinsey
*Attorney*—Schroeder, Siegfried & Ryan

[57] ABSTRACT

A removable field silage chopper in which the chopper is removably connected to the front of a tractor with a steering link between the steerable wheels of the tractor and the steerable wheels of the chopper to provide for movement of the chopper and tractor in unison. The power is supplied to the chopper components from a demountable shaft connected through gearing to the power take-off of the tractor. Similarly, the chopper is pivotally mounted on the front of the tractor so that it may be raised or lowered between working and transport positions.

11 Claims, 4 Drawing Figures

INVENTOR
Charles C. Thor
BY
Schroeder Siegfried & Ryan
ATTORNEYS

REMOVABLE SILAGE CHOPPER

My invention relates to a machine for cutting ensilage and more particularly to an improved silage chopper which may be readily added to a tractor for the purpose of operating the same and removed therefrom for the purpose of freeing the tractor for other applications.

Machines for the severing and chopping of ensilage or stalks from which grain or corn has been harvested are well known and in use. In the past, such machines have been specially constructed as self-contained units incorporating a motive and power supply as a part of the machine, thereby making them inapplicable for any other operation and requiring a significant investment in a particular special piece of machinery which had limited usage. In addition, tractors have been modified with a permanent installation in which a silage chopper and severing mechanism have been attached thereto in a permanent type installation with such structures being mounted on the side of the tractor or built onto the front end of a tractor limiting usage for such equipment and generally providing a structure which lacked mobility from the standpoint of operation in a field. Similar structures have been manufactured as a draft unit to be attached to the end of a tractor and generally these structures have lacked mobility and maneuverability making them difficult to use. These were, however, demountable.

In the present invention, a removable silage chopper is provided which may be readily connected and disconnected to the front end of a tractor to be steered with and driven thereby with the power for operating the same being taken from the power take-off of the tractor. An improved linkage system connects the silage chopper to the tractor in such a manner that it may be readily connected and disconnected thereto. It is further tied to the steering system of the tractor for increased mobility thereof and provides a simplified arrangement for discharge of the ensilage over the tractor to a collecting wagon towed by the tractor. This simplified structure requires a minimum of modification to a tractor which need not be removed therefrom to permit the tractor to be used in other applications. Similarly, the overall structure provides a compact design which is readily steerable in a field such that it may be easily used to sever stalks in a field and which will permit the towing of a collecting wagon by the tractor to provide an efficient and one man ensilage removal operation.

Therefore it is the principal object of this invention to provide an improved silage chopper which is removably mounted to a tractor requiring a minimum of permanent connections thereto and making the tractor available for other usages.

Another object of this invention is to provide a silage chopper which is simple in design and easy to attach and disconnect from a tractor.

A further object of this invention is to provide an ensilage chopper which may be readily mounted to a tractor being steerably connected thereto, and powered thereby to provide extreme maneuverability to the tractor.

A further object of this invention is to provide an improved silage chopper adapted for front end mounting to a tractor to permit the tractor to draw a collecting wagon at the rear thereof.

A further object of this invention is to provide an ensilage chopper of this type in which steering of the chopper support wheels is effected from the tractor steering wheels to increase maneuverability in fields.

Figure 2:
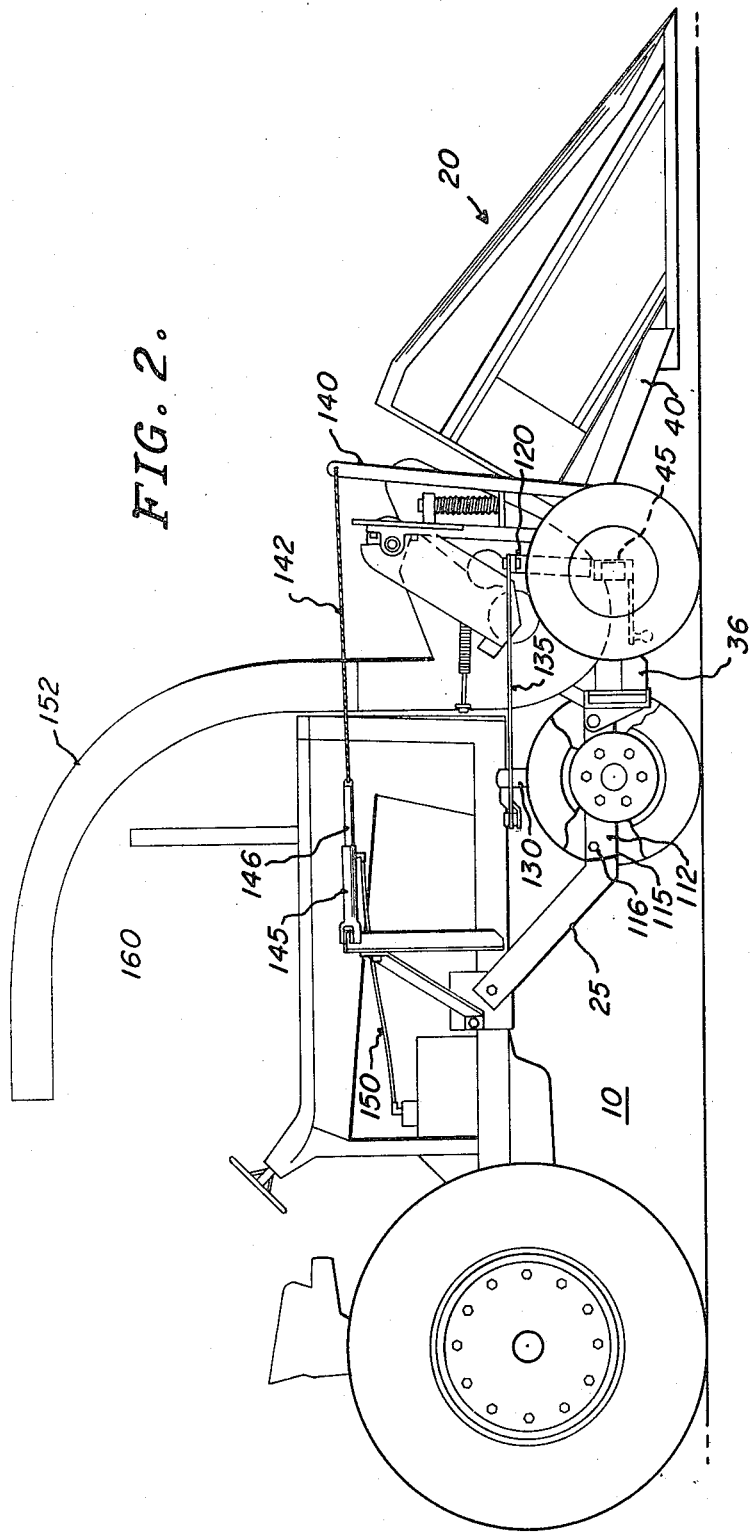
Figure 3:
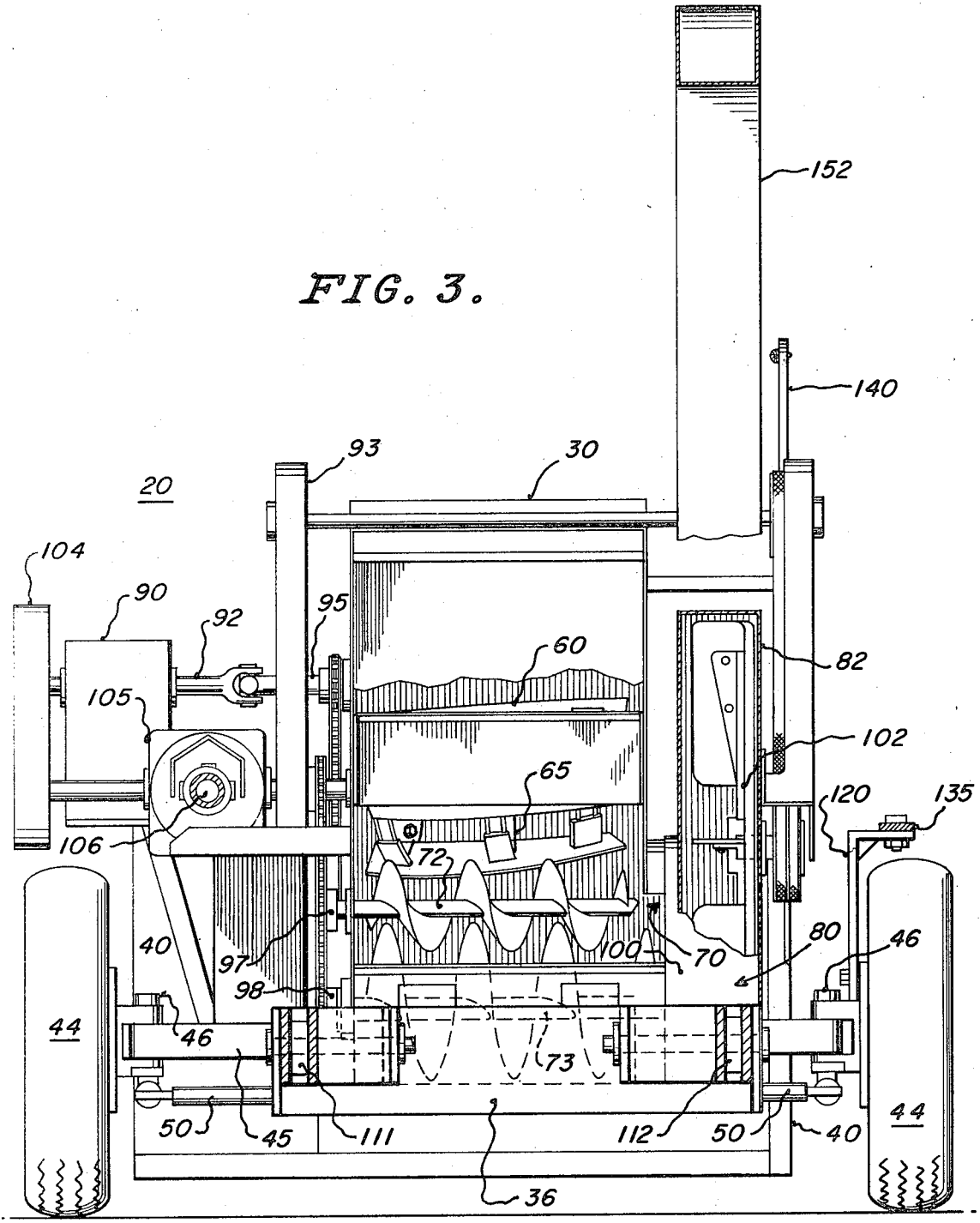

These and other objects of this invention will become apparent from a reading of the attached description together with the drawings wherein:

FIG. 1 is a side elevation view of the improved field silage chopper mounted on a tractor which tows a collecting wagon, FIG. 2 is a side elevation view of the opposite side of the field silage chopper mounted on a tractor, FIG. 3 is an end elevation view of the field silage chopper showing the connections on the same for the tractor, and FIG. 4 is a top view of the field silage chopper.

My invention in the removable field silage chopper provides a structure which may be readily attached and detached from a tractor which would carry the same in operation and supply the rotative power to the component parts of the chopper structure. This frees the tractor for other usage in agriculture and eliminates the necessity of a self-powered chopper unit or a permanently installed chopper on a tractor. Thus in the drawings, a conventional tractor as a motive source for the chopper unit is indicated generally at 10. In FIGS. 1 and 2 the chopper is shown attached to the front end of a tractor, as indicated generally at 20. The tractor may be any one of a number of conventional farm tractors having spaced steerable front wheels tied together with a tie link and a conventional power take-off at the rear of the tractor. The tractor is modified by the addition of a U shaped frame member 25 which is welded or otherwise suitably secured to the underside of the tractor frame as a permanent installation thereto and with bifurcated extremities of this frame projecting forward of the steerable front wheels and between the same.

The chopper 20 is of the type which resembles a conventional corn picker. It is comprised of a base frame structure 30 having a forwardly extending and tapered gathering section 32 which houses the gathering arms and includes slot sections 33 in the same into which the gathering arms or fingers 34 extend for the purpose of drawing stalks into the chopper. The tapered front section provides the housing and shield for the continuous belt mechanism (not shown) which mounts the gathering arms and the drive for the same with the arms moving along slotted openings in the frame to engage and move a stalk into the structure. In its preferred form, the chopper includes two slots in the front end of the same spaced apart the distance of a normal corn width row such that two lines of stalks may be severed and chopped at the same time. At the rear of the tapered gathering section and at an elevation of somewhere between 8 and 10 inches above the ground is positioned the severing section 35 which incorporates conventional cutting blades to sever the stalks as they are drawn into the chopper. This portion is mounted on the central part of the frame through supporting arms or brackets 40. The main frame of the chopper, as will be best seen in FIGS. 3 and 4 at 30 is a generally box-like structure having a cross beam 45 secured thereto which cross beam mounts the steerable wheels 44 of the chopper. The wheels are mounted through conventional pivot links or king pins 46 at the ends of the cross beam and the respective wheels are connected together with a tie link 50 such that they move together. The box-like frame structure 30 includes the chopper section 60 and an auger or feed section indicated generally at 70 positioned within the same. The box-like frame structure is open at the front extremity adjacent the severing knives such that the severed stalks will enter the structure to be chopped by reel type chopping blades 65 with the severed pieces falling into the lower portion of the frame structure wherein a pair of augers 72, 73 move the chopped pieces of material to one side of the frame on which is positioned the blower section, indicated generally at 80, and housed in the frame structure 82 attached to one side of the housing 30.

As will be seen in FIG. 3, the various functioning elements of the chopper, namely the gathering arms, severing knives, reel type chopping blades, the augers and the blower are all powered from a gear box, indicated generally at 90, with each of the units having separate drive shafts connected thereto. Thus as will be seen in FIG. 3, the gear box includes a drive shaft 92 leading to a drive mechanism, indicated at 93, extending from one side of the chopper to the other and through a shielded belt drive structure, indicated at 94, to drive the blower portion. Similarly, the structure includes a drive shaft 95 leading to the reel type chopper portion with suitable drives extending from the gear box 90 to the gathering and severing mechanisms (not shown). Also connected to the gear box 92 and through drive pulleys 97, 98 are the drives for the augers 72, 73 which are journaled or mounted in the frame 30 at one extremity in a cantilever type mounting with the opposite extremity of the housing, as indicated at 100, being open to the housing 80 of the blower such that material may be moved by the augers directly from the housing or box-like frame 30 into the blower housing 80 wherein it will be engaged by the paddle arms 102 of the blower to be discharged from the housing 80. The gear box 90 is connected through a geared housing 104 leading to a speed reducer 105 having an input shaft 106 at the end of the same by means of which rotative power is introduced into the gear box 90 to drive the various components of the chopper.

The chopper structure is mounted on the front end of a tractor through a pair of mounting arms 111, 112 which arms are pivotally connected to the cross brace or shaft 50 mounting the steerable wheels 45 of the chopper. The arms are pivoted at their connection to the brace or frame 50 and have apertures 115 in the ends of the same by means of which they may be pinned or coupled to the bifurcated ends of the connecting frame part 25 mounted on the tractor. Suitable mounting pins 116 couple the frame 25 with the arms 111, 112 to connect the steerable chopper to the front end of the tractor. A crank or arm 120 is attached to one of the wheels 44 such that turning movement may be imparted thereto. A similar flange 130 is connected to one of the steerable wheels on the tractor and a tie link 135 extends between the same which tie link 135 is readily demountable. Thus, turning movement from the tractor wheels is imparted through the tie link 135 to the crank 120 turning the wheels of the steerable chopper such that they will follow the steered wheels of the tractor. The spacing of the tractor wheels and that of the chopper are of the same width such that they may straddle rows of the stalks being cut and steer in correspondence with the tractor wheels.

Also mounted on the frame 30 of the chopper is an upstanding flange structure 140 to which is detachably connected a chain 142 leading to an actuator 145 mounted on the side of the tractor, the actuator being of the hydraulic type which is connected to the hydraulic power source of the tractor (not shown) through flexible hydraulic lines 150. The actuator is connected at its movable or shaft extremity 146 to the chain and the actuator 145 will operate to move the chopper or pivot the same on its wheel structure toward and away from the front end of the tractor to raise the gathering section for transport purposes and lower the same for severing purposes. The blower housing 80 has an upwardly extending duct 152 which has a bend in the same projecting back over the tractor and which is held in a raised position by means of a supporting arm 160 extending between the end of the duct 150 and the frame or cross brace 50 of the chopper to support the same.

The speed reducer or speed changer portion 105 and the input shaft 106 extending therefrom on the chopper frame has connected thereto a removable drive shaft of section 165 which drive shaft section includes universal coupling members 166 and a slidable shaft section 170 to permit connection and removal of the same. This in turn is connected to sheathed drive shaft 180 mounted on the other side of the tractor and connected to a gear box, indicated at 190, suitably connected to the rear of the tractor and leading to the power take-off of the tractor. Thus rotative movement from the power take-off at the rear of the tractor will be directed through the gear box 190 and along the sheathed drive shaft 180 on the side of the tractor toward the front end of the same wherein the drive shaft 180 is coupled to the input shaft 106 of the speed changer section 105 by means of the removable drive shaft link 165. Thus input power from the power transmission will be directed to the gear box 90 wherein it will drive all of the power shafts of the elements of the chopper at the desired speed relationships.

The removable field silage chopper can be connected to a tractor and powered from the same with a minimum amount of connection time. The tractor itself would be modified by the addition of a stationary but removable U shaped frame 25 beneath the same and with the addition of the actuator 145 attached to the side of the tractor frame. In addition, the flange 130 on the steerable wheel would be permanently installed and gear box 190 with the sheathed drive shaft 180 would be installed on the tractor with provisions for the gear box 190 to be removed or moved to one side whenever it was desired to operate the tractor and some piece of equipment associated therewith from the power take-off of the tractor. With these parts installed on the tractor, the connection of the field silage chopper thereto is effected by connecting the arms 110, 112 to the ends of the frame 25 with the addition of the pins 116 therethrough. Similarly, the tie link 135 would be connected to the upstanding bell crank type flanges 130 and 120 on the tractor and chopper wheels respectively such that the wheels may be moved in unison in steering. The chain 142 would be connected to the upstanding frame 140 on the chopper such that the actuator 145 could raise or lower the same. In addition, the removable drive shaft link 165 would connect the input of the speed changer mechanism 105 on the chopper frame to the shaft 180 on the tractor. The universal couplings 166 in this link permitted positive drive with relative movement between the tractor and chopper parts. With this assembly, the tractor would be steered and the chopper wheels will follow the steerable movements of the tractor to position the chopper frame relative to any desired working or cutting area.

In the operation of the field silage chopper, the rear of the tractor would be free to have connected thereto a wagon 200 into which the chopped silage would be blown. An additional pipe link 192 would be added to the duct 152 to direct the flow of silage from the blower 80 across the top of the tractor and above the wagon to fill the same. This would permit a single operator to drive the chopper in front of the tractor and haul a wagon behind the same to collect the chopped silage as the stalks were severed. Control of the operation of the chopper is effected by the operator on the tractor through the operation of the power take-off controls to drive the various components of the same and through the operation of the actuator 145 with the valve control (not shown) for the same to raise or lower the chopper between working and transport position. In its operation, power is supplied from the power take-off to rotate the functional components of the same. Thus, the operator need merely align the tractor with the rows of stalks to be severed and chopped and the chopper components, namely the gathering arms, the severing blades, the reel type chopper and the blower effect movement of the stalks into the chopper frame wherein the stalks are severed and chopped into small pieces. The augers through their cantilever mounting insure that all chopped material is directed into the blower section and the blower propels the chopped material through the duct work with sufficient force to carry it back to the wagon or vehicle towed by the tractor for collection of the same. This improved structure may be readily connected and disconnected from the tractor in a minimum amount of time, for example, 5 to 10 minutes, permitting the operator to use the chopper for silage harvesting operation and remove the chopper unit when the operation is complete to condition the tractor for any other farm operation.

In considering this disclosure it should be remembered that the present disclosure is illustrative only and the scope of the invention should be determined by the appended claims.

What is claimed is:

1. The removable field silage chopper comprising; a stalk gathering and severing mechanism mounted on a steerable wheeled support; a rotatable chopper means positioned in receiving relationship with the severing mechanism and adapted to chop stalk material into small pieces; auger means mounted on the wheeled support adjacent the chopper means and adapted to move the chopped pieces of stalk material parallel to the axis of cutting and to one side of the chopper means; blower means positioned on the wheeled support adjacent the auger means in material receiving relationship therewith and adapted to receive and discharge stalk material pieces from the chopper; connecting arm means mounted on the steerable wheeled support and adapted to be connected to the tractor near the front end of a tractor frame, tie rod linkage means connected to a tie rod of the wheels of the steerable wheeled support and adapted to be connected to the front steerable tractor wheels to cause the steerable wheels of the support to be steered with the front tractor wheels; power transmitting means connected to the gathering and severing means, the chopper means, auger means and blower means and driven from a single input shaft; and a demountable shaft means connected to the input shaft of the power transmitting means on the wheeled support and adapted to extend along the side of a tractor from the silage chopper to connect to a power takeoff of the tractor to be driven thereby.

2. The field silage chopper of claim 1 in which the blower means includes a discharge pipe connected to the outlet of the blower means and adapted to extend over the top of the tractor to the rear thereof.

3. The field silage chopper of claim 1 and including means connected between the tractor and the wheel support to elevate and lower the stalk gathering and severing mechanism thereof.

4. The field silage chopper of claim 1 in which the demountable shaft means includes slidable couplings and universal couplings therein.

5. The field silage chopper of claim 1 in which the auger means includes a pair of augers mounted on an axis parallel to the axis of the chopper means and parallel to the axis of the blower means with the blower means positioned to one side of and adjacent the augers and the chopper means.

6. The field silage chopper of claim 5 in which the augers are journaled and supported at one extremity only providing a cantilever type mounting remote from the blower means.

7. The field silage chopper of claim 1 in which the power transmitting means includes a gear reduction means connected to the input shaft thereof and providing a plurality of output shafts connected respectively to the stalk gathering and severing means, chopper means, auger means and blower means.

8. The field silage chopper of claim 3 in which the means connected between the tractor and the wheeled support includes an actuator adapted to pivot the wheeled support on its wheels relative to the tractor for lowering and elevating the stalk gathering portion thereof between working and transport position with said actuator being adapted to be connected to a source of hydraulic power on the tractor.

9. The field silage chopper of claim 1 in which the tie rod linkage means includes flange means connected to one of the wheels on the steerable wheeled support and on the tractor with a removable linkage connected therebetween.

10. The field silage chopper of claim 1 in which the connecting arm means includes pivoted arm members pivotally mounted on the wheeled support with connecting means at the free extremity of the same adapted to be connected to a U-shaped frame attached to the chassis of the tractor.

11. A field silage chopper adapted to be removably mounted to the front of a tractor comprising: a steerable wheeled support, stalk gathering, severing and chopping means mounted in cooperative relationship to each other and to said support, transferring means mounted to said support for receiving and conveying the chopped stalk from said support to a point remote therefrom, connecting arm means mounted on the steerable wheeled support and adapted to be connected to the tractor near the front end of a tractor frame, tie rod linkage means connected to a tie rod of the wheels of the steerable wheeled support and adapted to be connected to the front steerable tractor wheel assembly to cause the steerable wheels of the support to be steered with the front tractor wheels; power transmitting means connected to the gathering and severing means, the chopper means and transferring means and driven from a single input shaft; and a demountable shaft means connected to the input shaft of the power transmitting means on the wheeled support and adapted to extend along the side of a tractor from the silage chopper to connect to a power take-off of the tractor to be driven thereby.

* * * * *